United States Patent
Bodas et al.

(10) Patent No.: US 7,047,384 B2
(45) Date of Patent: May 16, 2006

(54) METHOD AND APPARATUS FOR DYNAMIC TIMING OF MEMORY INTERFACE SIGNALS

(75) Inventors: Amit Bodas, Folsom, CA (US); Zohar B. Bogin, Folsom, CA (US); David E. Freker, Sacramento, CA (US); Suryaprasad Kareenahalli, Sacramento, CA (US); Sridhar Ramaswamy, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 451 days.

(21) Appl. No.: 10/185,497

(22) Filed: Jun. 27, 2002

(65) Prior Publication Data

US 2004/0123060 A1 Jun. 24, 2004

(51) Int. Cl.
*G06F 1/12* (2006.01)
*G06F 1/10* (2006.01)
(52) U.S. Cl. .................. 711/167; 713/503; 711/168
(58) Field of Classification Search ................ 711/167; 713/503; 365/230, 233
See application file for complete search history.

(56) References Cited

U.S. PATENT DOCUMENTS

| | | | | |
|---|---|---|---|---|
| 5,530,754 A | * | 6/1996 | Garfinkle ..................... 725/8 |
| 5,794,020 A | * | 8/1998 | Tanaka et al. ............. 713/401 |
| 5,913,215 A | * | 6/1999 | Rubinstein et al. .......... 707/10 |
| 6,105,144 A | * | 8/2000 | Wu ............................ 713/401 |
| 6,226,757 B1 | * | 5/2001 | Ware et al. ................. 713/503 |
| 6,430,696 B1 | * | 8/2002 | Keeth ......................... 713/503 |
| 6,484,268 B1 | * | 11/2002 | Tamura et al. ............. 713/600 |
| 6,510,503 B1 | * | 1/2003 | Gillingham et al. ........ 711/167 |
| 6,647,027 B1 | * | 11/2003 | Gasparik et al. ............ 370/519 |
| 6,801,989 B1 | * | 10/2004 | Johnson et al. ............ 711/167 |
| 6,898,726 B1 | * | 5/2005 | Lee ............................. 713/503 |

OTHER PUBLICATIONS

Microsoft Computer Dictionary, 5th ed. 2002 Microsoft Press, p. 19.*

* cited by examiner

*Primary Examiner*—Donald Sparks
(74) *Attorney, Agent, or Firm*—Racheol Wu (57) ABSTRACT

A method and apparatus for using different timings to latch signals sent by two memory devices of identical design to compensate for differences in the lengths of conductors across which the signals must propagate.

20 Claims, 6 Drawing Sheets

METHOD AND APPARATUS FOR DYNAMIC TIMING OF MEMORY INTERFACE SIGNALS

FIELD OF THE INVENTION

A method and an apparatus for dynamically selecting the timing used with signals of a memory interface to which multiple memory devices are coupled is disclosed.

ART BACKGROUND

Digital electronic systems, such as computers, have long required random access memory systems for relatively quick access to data. Over time, and with the increasing complexity of electronic systems, such memory systems have developed into implementations using a memory controller providing a memory interface to a memory bus to which one or more memory devices are coupled.

Digital electronic systems have continued to become ever faster, and the speeds at which such memory interfaces operate have continued to increase. Furthermore, the timing windows used in such memory interfaces, i.e., the periods of time during which a signal in such a memory interface is deemed to be stable enough to be reliably latched have continued to be shortened as part of this speeding up such memory interfaces.

Reliable latching of a signal requires that a signal have propagated the length of a conductor from the component transmitting the signal to the component receiving the signal, and the passage of enough additional time to compensate for effects on the signal from any imperfections in the conductor or variations from the design characteristics of either the transmitting or receiving components. In other words, due to a number of factors that could affect the quality or the precision of the timing of a signal, it has long been common practice to "pad" the timing by which a signal is latched to ensure that a signal that has been received is fully "settled" (i.e., stable) at the time that latching occurs. In earlier systems with slower interfaces, timing windows were often lengthy enough to provide both considerably more time to allow a signal to stabilize before latching, and a considerable amount of time after the latching of a signal before transmission of the signal by a transmitting component would end. However, current systems with faster interfaces cannot afford to provide such lengthy timing windows, because each transfer of signals is provided with less time in which to take place.

It is common practice to mount memory devices used in such a memory system to one or more circuit boards with conductive traces forming a memory bus to connect such memory devices to the memory interface provided by a memory controller. It is often the case that traces connecting one memory device to a memory controller are of a different length than traces connecting another memory device to the same memory controller. It is also common practice to design the logic of memory controllers to use the same timing in latching corresponding signals received from multiple memory devices in such a system.

However, mismatches in trace lengths between different memory devices and a memory controller can cause the timing window for the latching of one signal from one memory device by a memory controller to be shifted in time relative to the timing window during for the latching of a corresponding signal from another memory device by the same memory controller. In other words, even if two substantially identical memory devices with substantially identical timing characteristics transmit corresponding signals at the same time, the fact that the signal sent by one memory device must propagate across a longer trace than the corresponding signal of the other memory device will cause the timing window for the signal sent by the one memory device to both start and end later than the timing window for the signal sent by the other memory device at the point where those signals reach the memory controller.

For a memory controller to use the same timing with corresponding signals from different memory devices where the timing windows are shifted relative to each other, the timing used by the memory controller must be set to cause latching to occur during a time in which the shifted timing windows overlap. However, as timing windows have continued to be shortened as part of speeding up memory interfaces, the amount of time during which such shifted timing windows overlap has continued to decrease, leaving progressively less time for stability of signals to be achieved and held so that latching may reliably take place.

BRIEF DESCRIPTION OF THE DRAWINGS

The objects, features, and advantages of the invention as hereinafter claimed will be apparent to one skilled in the art in view of the following detailed description in which:

DETAILED DESCRIPTION

Although numerous details are set forth for purposes of explanation and to provide a thorough understanding in the following description, it will be apparent to those skilled in the art that these specific details are not required in order to practice the invention as hereinafter claimed.

A technique for dynamically selecting the timing used with signals of a memory interface to which multiple memory devices are coupled is disclosed. Specifically, an embodiment concerns using multiple dynamically selected timing devices or a single timing device with dynamically selected timing settings to time the latching of one or more signals received from dynamically selected memory devices. However, although embodiments are discussed in reference to memory devices, the invention as hereinafter claimed is also applicable to a variety of other devices such as processors and/or I/O devices coupled to processor and/or peripheral interfaces, and/or any of a variety of buses.

Figure 1:
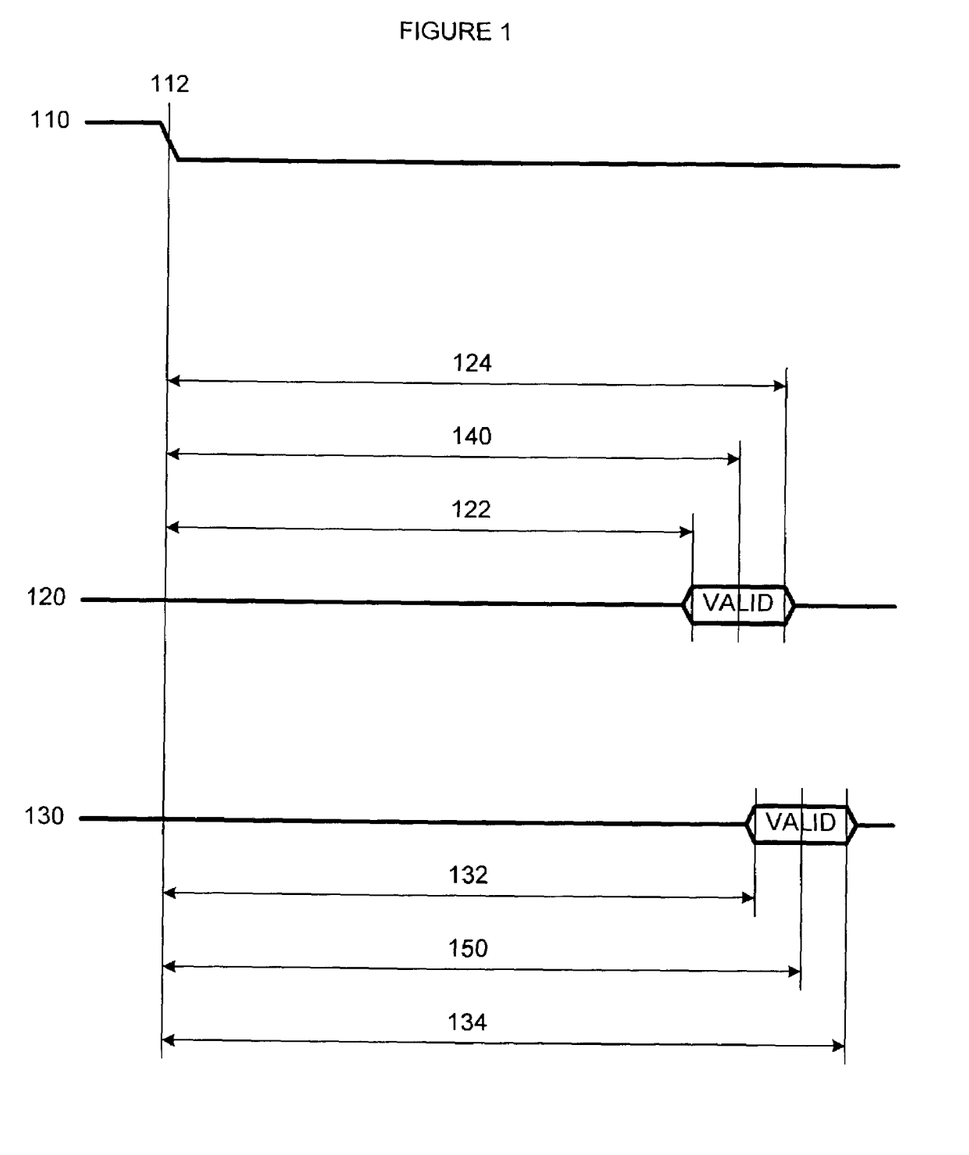
FIG. 1 is a timing diagram of an embodiment of a memory system.

FIG. 1 depicts a timing diagram of an embodiment in the form of activity on an interface between electronic devices, and specifically, activity between a memory controller and two memory devices through a memory interface. At time 112, a control signal 110 is sent by a memory controller to two different memory devices. At the end of time interval 122, the memory controller receives a signal 120 sent by one memory device in response to control signal 110. Signal 120 has a timing window that starts at the end of time interval 122 and ends at the end of time interval 124. In other words, starting at the end of time interval 122, signal 120 is stable enough to be reliably latched by the memory controller, and starting at the end of time interval 124, signal 120 is no longer stable enough to be so reliably latched. Also, at the end of time interval 132, the memory controller receives signal 130 sent by the other memory device, also in response to control signal 110. In a manner similar to signal 120, signal 130 has a timing window that starts at the end of time interval 132 and ends at the end of time interval 134. At the end of time interval 140, signal 120 is latched by the memory controller, and correspondingly, signal 130 is latched by the memory controller at the end of time interval 150. The ending of time intervals 140 and 150 are set such that the latching of signals 120 and 130 occur during their respective timing windows in order to ensure that signals 120 and 130 are each stable when latched.

As can be seen in FIG. 1, the timing windows for signals 120 and 130 are shifted in time relative to each other, i.e., they do not start and end at the same times. In this embodiment, the two memory devices have each sent their respective signals to the memory controller through a different conductor and each of the two conductors are of a different length, thereby causing the intervals of time required for the start and end of the two timing windows to reach the memory controller on the other end of their respective conductors to be different. Where a memory interface operates at a speed that is sufficiently high, and where the difference in the lengths of the two conductors is substantial enough, it may not be possible for a memory controller to use a single timing setting that would result in the use of the same time interval, starting from time 112, to time the latching of both signals 120 and 130. In other words, it may not be possible use a single timing setting that would cause time intervals 140 and 150 to be of the same duration and still reliably latch both signals 120 and 130 within their respective time windows. Indeed, though not specifically shown in FIG. 1, it is entirely possible that a large enough difference in the lengths of two conductors could result in the two timing windows being shifted enough that they no longer overlap. As can be seen in FIG. 1, time intervals 140 and 150 are caused to end at different times, because the memory controller uses different timing settings to latch signals 120 and 130, respectively, to compensate for the relative shifting of the timing windows.

In a different variation of this embodiment, signals 120 and 130 are received by the memory controller on a common conductor (as opposed to separate conductors) that is "bused" or "daisy chained" among the two memory devices. Despite the use of the same conductor, this can also cause signals 120 and 130 to propagate differing distances along the single conductor to reach the memory controller and cause the timing windows for signals 120 and 130 to be shifted relative to each other. Again, the memory controller compensates for the resulting relative shift of the timing windows by using different timing settings to latch signals 120 and 130.

As will be recognized by those skilled in the art, the memory controller may be of any of a wide variety of designs to provide a way by which other devices coupled to the memory controller may make use of memory devices for storing data. Such designs include, but are not limited to, combinational logic, state machines and/or sequencers.

In many variations of this embodiment, it is likely that the memory devices would be of very similar or even identical design, either to the extent of performing the same functions, and/or to the extent of meeting the same timing characteristics in order to ensure consistency of response by each memory device to actions taken by the memory controller. This is a reflection of the common practice of designing memory controllers with the presumption that memory devices to be coupled with a memory controller will be designed to conform to timing and other characteristics set forth by widely accepted memory interface specifications that are used to facilitate industry wide interchangeability of memory components. In such embodiments, it would be especially important to ensure that the memory devices transmit signals with timings, including starting and ending times for timing windows, that conform to a specification for which the memory controller had also been designed or programmed.

Examples of a widely accepted memory interface specification to which the memory controller and the memory devices may conform may include, but are not limited to, SDRAM (synchronous dynamic random access memory) memory interface standards in wide use in which at least some of the activity of the memory interface is synchronized to a clock signal transmitted between them. This may include DDR (double data rate) variants of SDRAM memory interfaces which have come into wide use in computer systems. Specifically, it may be that the transmission of control signal 110 at time 112 is synchronized to a clock signal (not shown), as well as the start and end times of the transmission of signals 120 and 130 at the point where they were transmitted by their respective memory devices. However, despite such synchronization, the timing windows in which signals 120 and 130 may be reliably latched are still shifted in time at the point where they are received by the memory controller due to differences in lengths of the conductors, as has been discussed at length, above. However, it is likely the case that the shift in time windows will not be to such an extent that the latching of signal 120 at the end of interval 140 and the latching of signal 130 at the end of interval 150 will still occur within a different cycle of the clock signal.

Although the discussion of FIG. 1 centers on the transmission of control signals by a memory controller to memory devices, those skilled in the art will appreciate that the same approach described with regard to control signal 110 could also be applied to signals transmit address signals. Furthermore, depending on the protocol of a given memory interface, the same approach could be applied to the transmission of data signals to convey data with signals sent in response by memory devices being acknowledgement or other signals aside from data signals. In essence, the approach depicted in FIG. 1 may be used for signals conveying addresses, commands, data, etc.

Figure 2A:
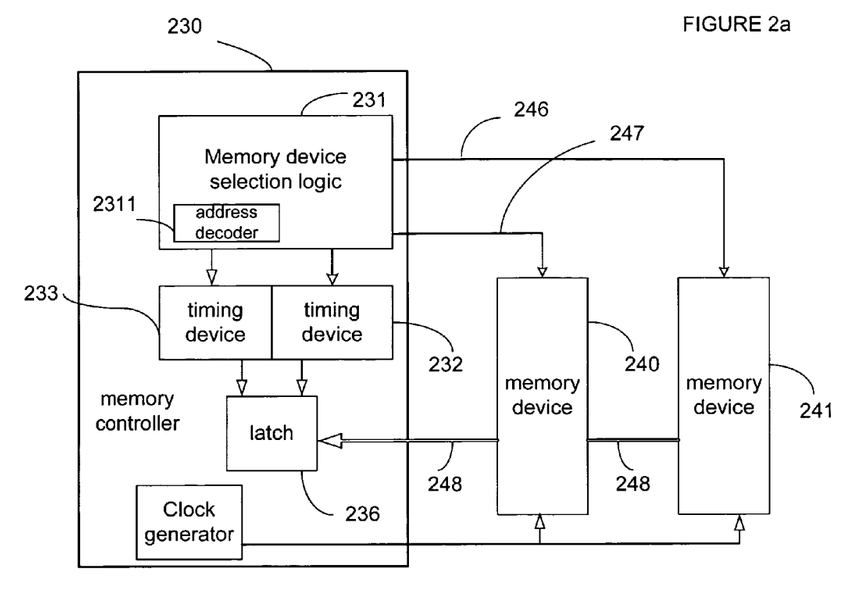
FIGS. 2a and 2b are two block diagrams of two embodiments of a memory controller.
Figure 2B:
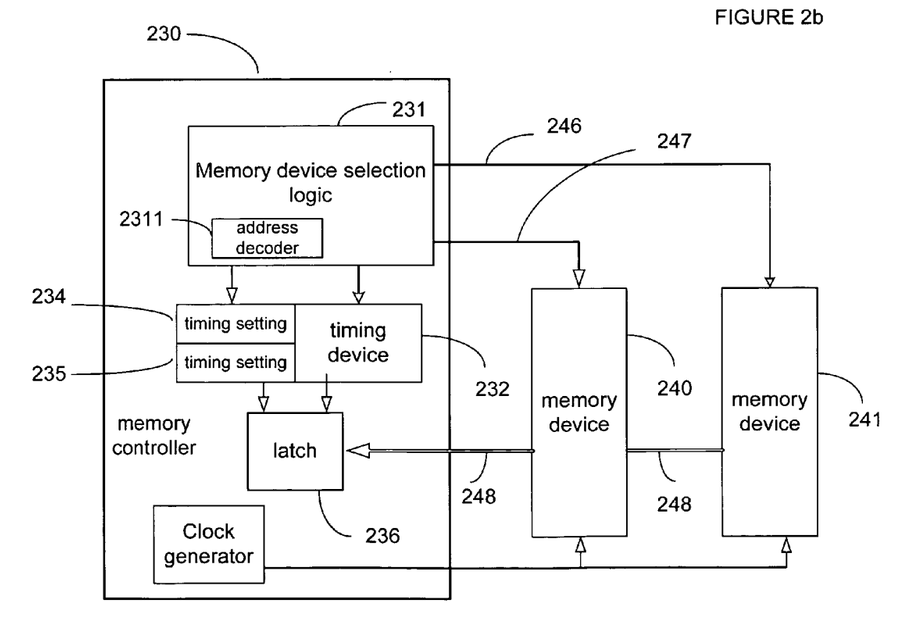

FIGS. 2a and 2b depict block diagrams, each of a different embodiment in the form of a different memory controller 230. In both FIGS. 2a and 2b, memory controller 230 is coupled to both memory devices 240 and 241 by data signals 248, as well as individually to memory devices 240 and 241 by control lines 246 and 247, respectively. Furthermore, in both FIGS. 2a and 2b, memory controller 230 incorporates memory device selection logic 231 and latch 236. Memory device selection logic 231 determines which one of memory devices 240 and 241 is to be accessed and/or used in performing a memory operation such as reading data from one or the other of memory devices 240 and 241. Memory device selection logic 231 may be incorporated into or cooperate with a memory address decoder 2311 to select one or the other of memory devices 240 and 241 based on a decode of a memory address provided to memory controller 230. Control lines 246 and 247 provide a mechanism by which memory device selection logic 231 may transmit control signals to individually control memory devices 240 and 241. Alternatively, although control lines 246 and 247 are depicted as emanating directly from memory device selection logic 231, it will be understood by those skilled in the art that many different implementations of memory controller logic are possible such that control lines 236 and 237 may emanate from another portion or portions of memory controller 230. The exact function of control lines 246 and 247 may be to convey commands, addresses, etc.

In both FIGS. 2a and 2b, data signals 248 are coupled to both memory devices 240 and 241. However, despite sharing common conductors, the distance that one or more signals must propagate between memory device 240 and memory controller 230 differs from that of memory device 241 and memory controller 230. In many digital electronic devices, this difference in the distance that a signal must propagate on one or more common conductors is the result of the common practice of "daisy chaining" or routing such conductors through connections to multiple memory devices in the fashion of a chain along the length of such conductors. Whether the result of daisy chaining or some other physical configuration, this difference in the distance of one or more signals results in one or more signals propagating between memory device 240 and memory controller 230 in an amount of time differing from that in which corresponding signals propagate between memory device 241 and memory controller 230. Specifically, this difference can result in corresponding signals, such as signals carrying data, being received from memory devices 240 and 241 at different times, even in response to a control signal transmitted by memory controller 230 to both memory devices 240 and 241, simultaneously. This, in turn, can cause the timing windows of corresponding signals received by memory controller 230 from both memory devices 240 and 241 to be shifted relative to each other such that timing used by memory controller 230 to reliably latch a signal received from memory device 240 may not be useable to reliably latch a corresponding signal received from memory device 241.

In FIG. 2a, depending on whether memory device 240 or 241 is being accessed and/or used, memory device selection logic 231 dynamically selects one or the other of timing device 232 or 233 to control latch 236. Timing devices 232 and 233 may be delay line loops or any of a variety of other timing devices as those skilled in the art will understand. The selection of timing device 232 or 233 allows the timing of the latching by memory controller 230 of signals propagating from one or the other of memory devices 240 and 241 to be dynamically selected to compensate for differences in propagation time caused by the difference in distances through which the signals must propagate.

In FIG. 2b, memory device selection logic 231 signals timing device 232 to control latch 236 with a timing setting dynamically selected from either of timing settings 234 or 235. Timing settings 234 and 235 may be programmable timing settings maintained in registers for use by timing device 232, or may be set and/or maintained in any of a variety of ways as those skilled in the art will understand. The selection of timing settings 234 or 235 allows the timing of the latching by memory controller 230 of signals propagating from one or the other of memory devices 240 and 241 to be dynamically selected to compensate for differences in propagation time caused by differences in the distances that corresponding signals must propagate.

Although the discussions of the embodiments depicted in FIGS. 2a and 2b have centered largely on the latching of data signals propagating from memory devices to a memory controller as part of reading data from memory devices, it will be understood by those skilled in the art that the dynamic selection of timing may be used in the latching of signals other than data signals.

Figure 3A:
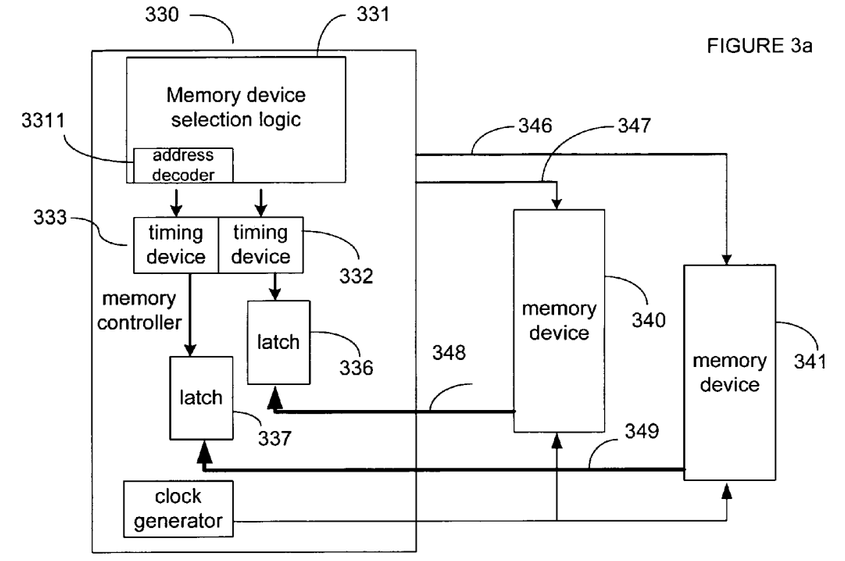
FIGS. 3a and 3b are two block diagrams of another two embodiments of a memory controller.
Figure 3B:
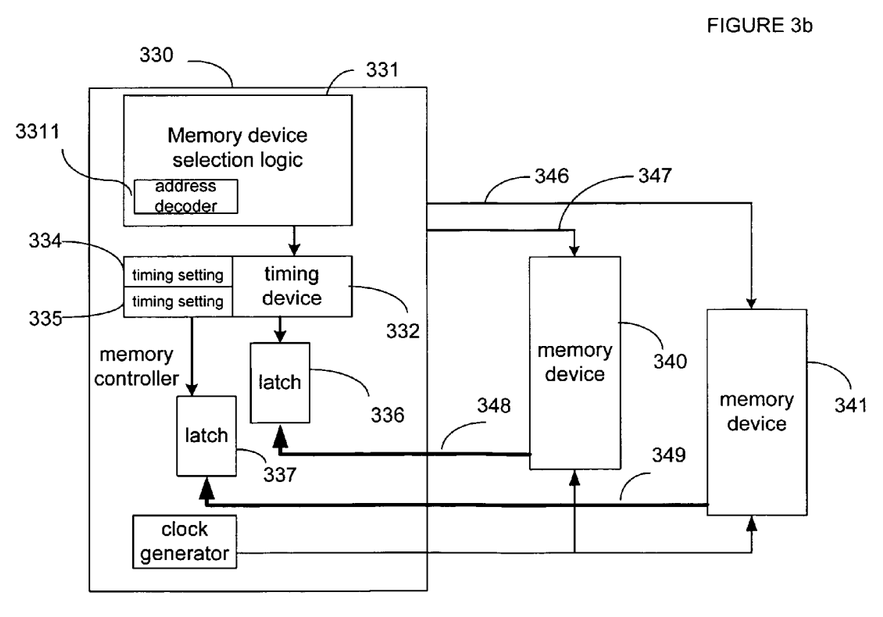

FIGS. 3a and 3b depict block diagrams of another two other embodiments, each of a different form of memory controller 330. In FIGS. 3a and 3b, memory controller 330 is coupled to memory device 340 by control line 346 and data lines 348, and to memory device 341 by control line 347 and data lines 349. Memory controller 330 incorporates memory device selection logic 331 and latches 336 and 337. Memory device selection logic 331 determines which one of memory devices 340 and 341 is to be accessed and/or used in performing a memory operation such as reading data from one or the other of memory devices 340 and 341. Memory device selection logic 331 may be incorporated within or cooperate with a memory address decoder 3311 to select one or the other of memory devices 340 and 341 based on a decode of a memory address provided to memory controller 330. Alternatively, memory device selection logic 331 may be incorporated within or cooperate with bank selection logic (not shown) to treat at least portions of memory devices 340 and 341 as banks of memory by selecting one or the other of memory devices 340 and 341 as part of an implementation of memory bank interleaving. Control lines 346 and 347 provide a mechanism by which memory device selection logic 331 may individually control memory devices 340 and 341. Alternatively, although control lines 346 and 347 are depicted as emanating directly from memory device selection logic 331, it will be understood by those skilled in the art that many different implementations of memory controller logic are possible such that control lines 346 and 347 may emanate from another portion or portions of memory controller 330. The exact function of control lines 346 and 347 may be to convey commands, addresses, etc.

In both FIGS. 3a and 3b, the length of data lines 348 coupling memory device 340 to memory controller 330 may differ from that of data lines 349 coupling memory device 341 to memory controller 330. Placement of memory devices 340 and 341 on a circuit board relative to memory controller 330 may cause such a difference in length to occur. Whatever the exact reason, this difference in the length of one or more conductors results in one or more signals propagating from memory device 340 to memory controller 330 in an amount of time differing from that in which corresponding signals propagate from memory device 341 to memory controller 330. Specifically, this difference can result in corresponding signals (including, but not limited to signals carrying data) being received by memory controller 330 from memory devices 340 and 341 at different times, even if memory devices 340 and 341 have identical timing characteristics and even in response to a control signal sent to both memory devices 340 and 341 by memory controller 330, simultaneously. This can cause the timing windows of corresponding signals received by memory controller 330 from both memory devices 340 and 341 to be shifted in time relative to each other such that the time during which a signal received from memory device 340 is stable enough to be reliably latched may not overlap with the time during which a corresponding signal received from memory device 341 is also stable enough to be latched.

In FIG. 3a, depending on whether memory device 340 or 341 is being accessed and/or used, memory device selection logic 331 dynamically selects one or the other of timing device 332 or 333 to control the latching of signals received by latches 336 or 337, respectively, via data lines 348 or 349.

Timing devices 332 and 333 may be delay line loops or any of a variety of programmable or non-programmable timing devices as those skilled in the art will understand. The selection of timing device 332 or 333 allows the timing of the latching of signals propagating from one or the other of memory devices 340 and 341 to be dynamically selected to compensate for differences in propagation time caused by differences in lengths of conductors.

In FIG. 3b, memory device selection logic 331 causes timing device 332 to control latches 336 or 337 with a timing setting dynamically selected from either of timing settings 334 or 335, thereby controlling the timing of the latching of signals on data lines 348 or 349 by latches 336 or 337, respectively. Timing settings 334 and 335 may be programmable timing settings maintained in registers for use by timing device 332, or may be set and/or maintained in any of a variety of ways as those skilled in the art will understand. The selection of timing settings 334 or 335 allows the timing of the latching of signals propagating from one or the other of memory devices 340 and 341 to be dynamically selected to compensate for differences in propagation time caused by differences in lengths of conductors.

In FIGS. 3a and 3b, as an alternative to varying the time at which signals received by memory controller 330 from one or the other of memory devices 340 and 341 are latched, the timing of control signals transmitted by memory controller 330 to each of memory devices 340 and 341 via control lines 346 and 347 may be varied, instead. Specifically, timing settings 334 and 335 could be used provide different timings for the transmission of control signals by memory controller 330 to each of memory devices 340 and 341 to compensate for difference in lengths of conductors, so that when memory devices 340 and 341 send signals in response to their respective control signals, the signals sent by memory devices 340 and 341 both reach memory controller 330 at substantially the same time so that they may be latched, simultaneously.

Although the discussions of the embodiments depicted in FIGS. 3a and 3b have centered largely on the latching of data signals propagating from memory devices to a memory controller as part of reading data from memory devices, it will be understood by those skilled in the art that the dynamic selection of timing may be used in transmitting signals other than control signals, or may be used in the latching of signals other than data signals.

Figure 4A:
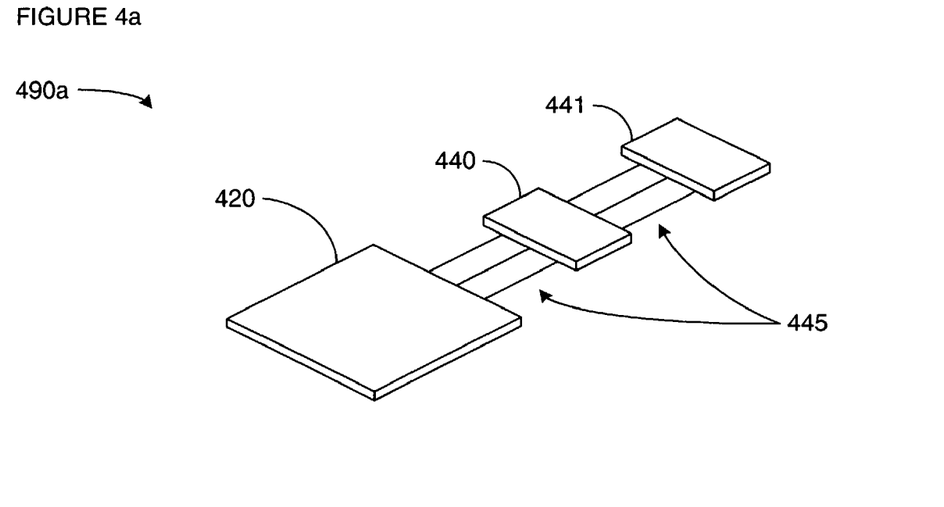
FIGS. 4a and 4b are perspective views of two embodiments of a memory system.
Figure 4B:
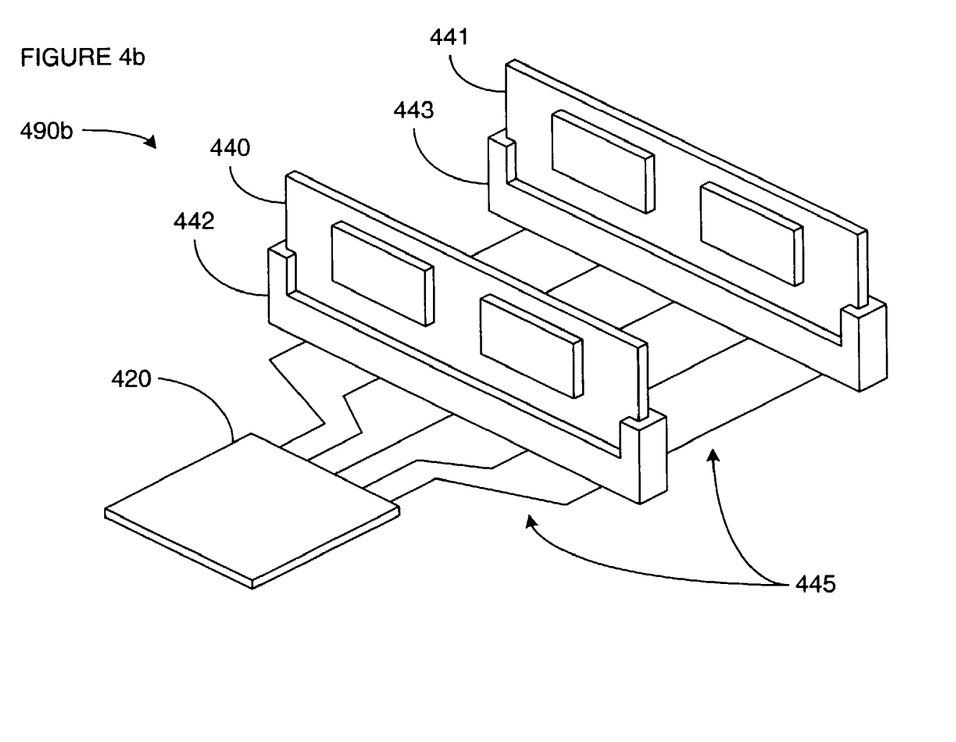

FIGS. 4a and 4b depict perspective views of two embodiments in the form of two variations of a memory system, 490a and 490b, with their components positioned as may commonly be expected on a surface of a circuit board (the edges of which are not explicitly shown). In FIGS. 4a and 4b, integrated circuit 420 is coupled to memory devices 440 and 441 by bus 445 which is configured in a widely used "daisy chain" or "bussing style" whereby a number of the conductors making up bus 445 couple integrated circuit 420 to memory device 440, as the first device in the "chain," before continuing still further as contiguous conductors from integrated circuit 420 to memory device 441, as the second device in the "chain."

In FIG. 4a, memory devices 440 and 441 are individual integrated circuits depicted as being positioned relative to integrated circuit 420 in a manner commonly seen in digital electronic devices such as graphics boards, disk drive controllers, single board controllers, or single board computer systems. In such digital electronic systems, integrated circuit 420 may be a graphics controller circuit, a disk drive controller circuit, or a processor support circuit incorporating a memory controller to cooperate with memory devices 440 and 441 to store and retrieve data.

In FIG. 4b, memory devices 440 and 441 are circuit boards carrying one or more individual integrated circuits, and are depicted as being positioned relative to integrated circuit 420 in a manner commonly seen in digital electronic devices such as redundant disk array controllers and computer systems. In such digital electronic systems, integrated circuit 420 may be a processor support circuit or a redundant disk array controller incorporating a memory controller to cooperate with memory devices 440 and 441 to store and retrieve data. Unlike memory devices 440 and 441 of FIG. 4a, memory devices 440 and 441 of FIG. 4b are depicted as being socketed, i.e., removably installed in memory sockets 442 and 443, respectively.

The positions of memory devices 440 and 441 in both FIGS. 4a and 4b, usually result in at least some of the conductors of bus 445 providing a connection between memory device 440 and integrated circuit 420 that is shorter than the connection between memory device 441 and integrated circuit 420. This difference in lengths results in a difference in the amount of time required by signals on bus 445 to propagate between integrated circuit 420 and each of memory devices 440 and 441. To compensate for this difference in time of propagation of signals, the memory controller within integrated circuit 420 dynamically selects different timings in carrying out identical memory operations (e.g., reading or writing data, setting registers, retrieving status, etc.) between integrated circuit 420 and either of memory devices 440 and 441, depending on which of memory devices 440 and 441 is accessed and/or used.

Figure 5A:
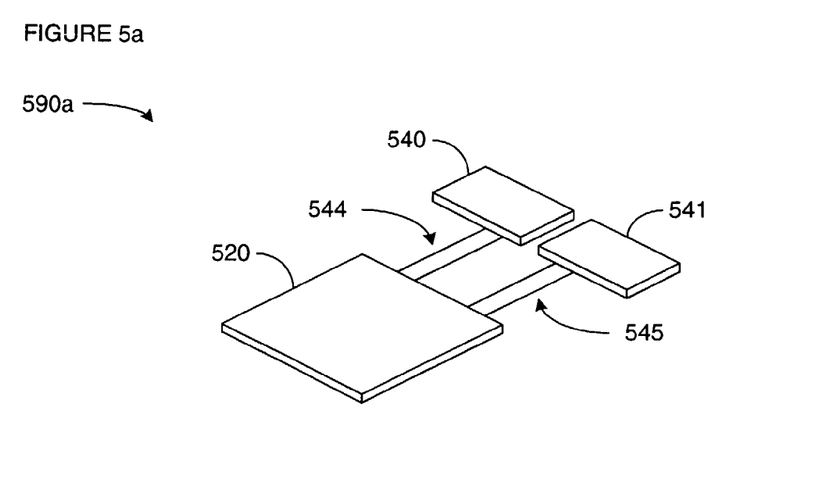
FIGS. 5a and 5b are perspective views of two other embodiments of a memory system.
Figure 5B:
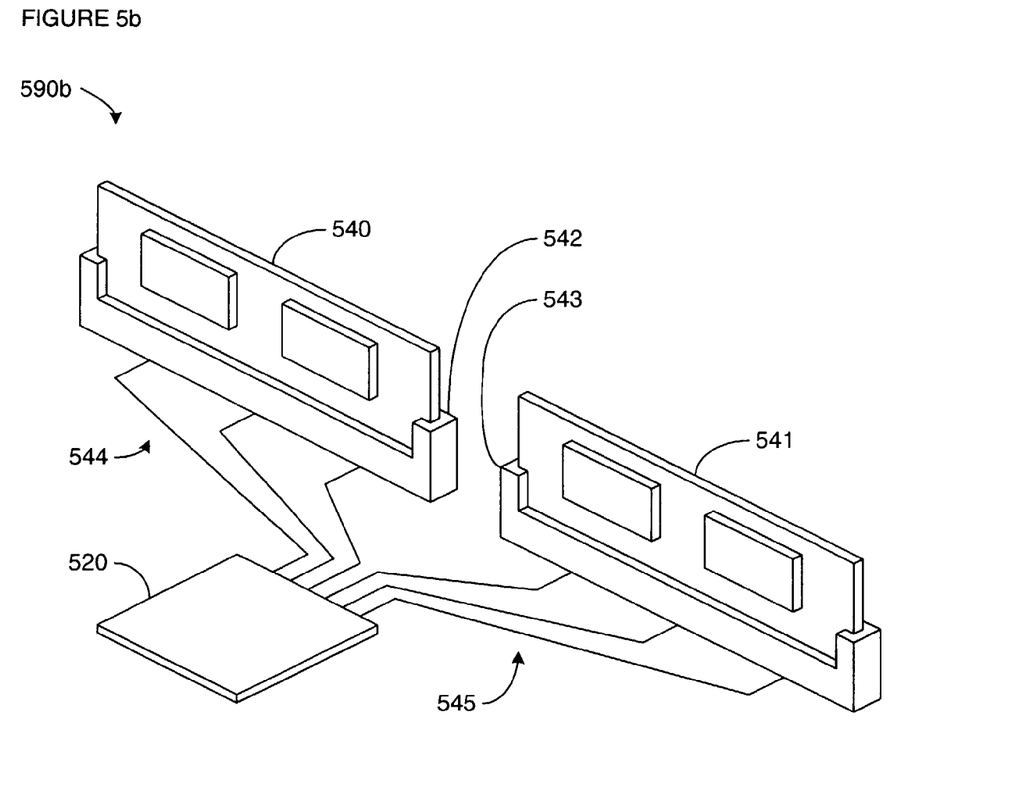

FIGS. 5a and 5b depict perspective views of two other embodiments in the form of two variations of a memory system, 590a and 590b, with their components positioned as may commonly be expected on a surface of a circuit board (the edges of which are not explicitly shown). In FIGS. 5a and 5b, integrated circuit 520 is coupled to memory devices 540 and 541 by buses 544 and 545, respectively.

In FIG. 5a, memory devices 540 and 541 are individual integrated circuits depicted as being positioned relative to integrated circuit 520 in a manner commonly seen in digital electronic devices such as graphics boards, disk drive controllers, single board controllers, or single board computer systems. In such digital electronic systems, integrated circuit 520 may be a graphics controller circuit, a disk drive controller circuit, or a processor support circuit incorporating a memory controller to cooperate with memory devices 540 and 541 to store and retrieve data.

In FIG. 5b, memory devices 540 and 541 are circuit boards carrying one or more individual integrated circuits, and are depicted as being positioned relative to integrated circuit 520 in a manner seen in a number of digital electronic devices such as film production graphics systems and computer systems. In such digital electronic systems, integrated circuit 520 may be a graphics processor or a processor support circuit incorporating at least a memory controller to cooperate with memory devices 540 and 541 to store and retrieve data. Unlike memory devices 540 and 541 of FIG. 5a, memory devices 540 and 541 of FIG. 5b are depicted as being socketed, i.e., removably installed in memory sockets 542 and 543, respectively.

Although the manner in which memory devices 540 and 541 in both FIGS. 5a and 5b are depicted might suggest that corresponding conductors of buses 544 and 545 are necessarily of equal lengths, as those skilled in the art will appreciate, space constraints often do not allow memory devices such as memory devices 540 and 541 to be positioned so that buses such as buses 544 and 545 will have corresponding conductors of equal length. This difference in lengths that is, therefore, likely to occur results in a difference in the amount of time required by corresponding signals of buses 544 and 545 to propagate between integrated circuit 520 and memory devices 540 and 541, respectively. To compensate for this difference in time of propagation of signals, the memory controller within integrated circuit 520 dynamically selects different timings in carrying out identical memory operations (e.g., reading or writing data, setting registers, retrieving status, etc.) between integrated circuit 520 and either of memory devices 540 and 541, depending on which of memory devices 540 and 541 is accessed and/or used.

Figure 6:
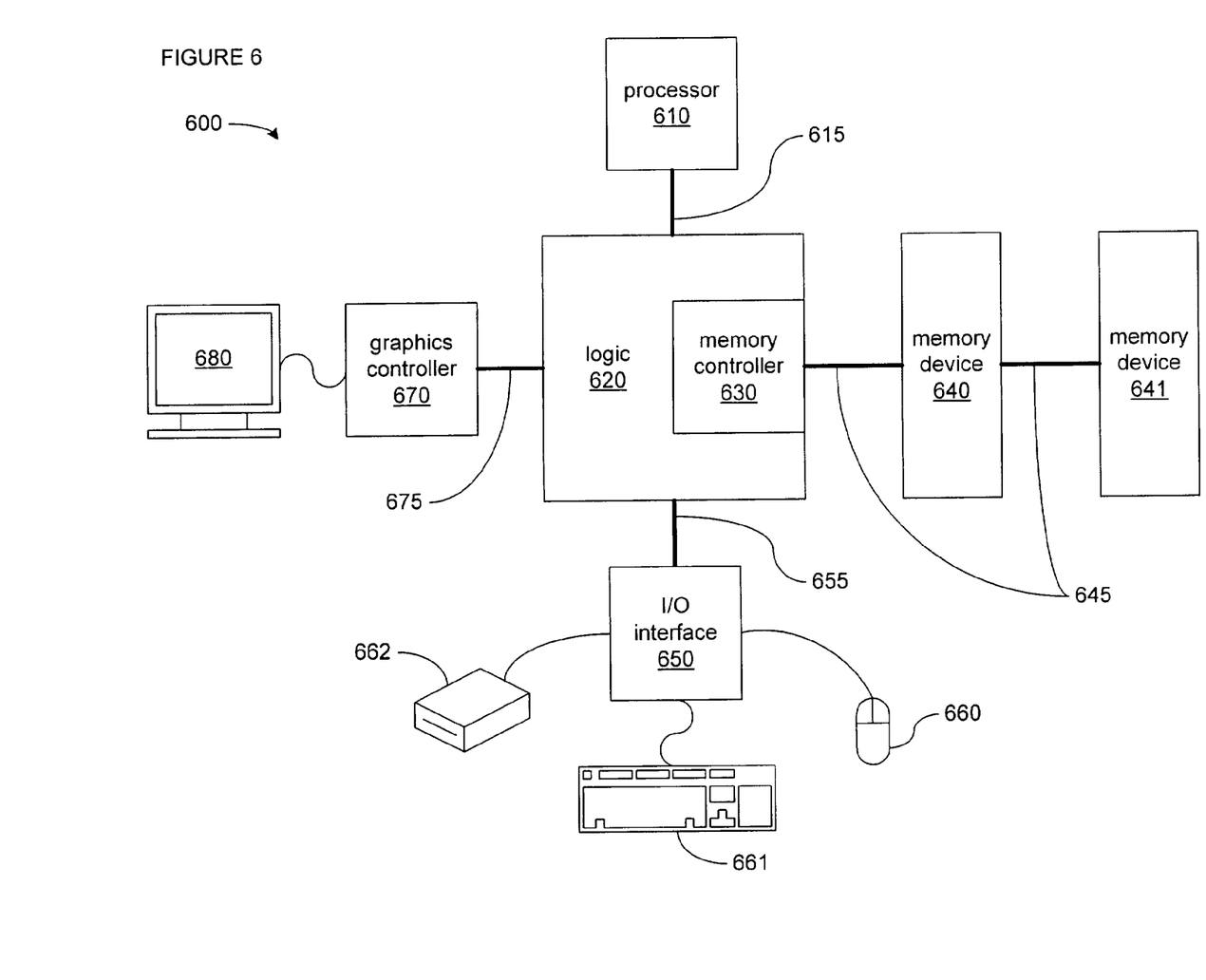
FIG. 6 is a block diagram of one embodiment of a computer system.

FIG. 6 depicts a block diagram of one embodiment in the form of computer system 600. Processor 610 is coupled via local bus 615 to logic 620, which in turn, is coupled to memory devices 640 and 641 by bus 645. Logic 620 may, in turn, also be coupled to I/O interface 650 by bus 655 and/or to graphics controller 670 by bus 675. I/O interface 650 may be further coupled to one or more I/O devices such as I/O devices 660–662, and graphics controller 670 may be further coupled to one or more display devices such as display device 680. Logic 620 may be a single integrated circuit, or the functions performed by logic 620 may be distributed among multiple integrated circuits. Also, the functions of I/O interface 650 and/or graphics controller 670 may be incorporated within the one or more integrated circuits making up logic 620.

Computer system 600 may have access to a machine-readable medium such as magnetic and/or optical disks, non-volatile solid state memory devices, etc., to supply instructions that could be executed by processor 610 of computer system 600. The execution of such instructions may cause processor 610 and/or computer system 600 to perform any of a number of operations involving memory controller 630 and/or memory devices 640 and 641. Although computer system 600 is depicted with an assortment of components often found as part of typical computer systems, it will be understood by those skilled in the art that computer system 600 is depicted merely as an example of a machine having a processing element, and that other forms of machines with a processing element such as microcontrollers, appliance controllers, industrial process controllers, etc. may be substituted for computer system 600.

In one variation of this embodiment, logic 620 incorporates memory controller 630 to provide bus 645. In another variation of this embodiment, logic 620 and memory controller 630 are within separate integrated circuits coupled by yet another bus (not shown).

Bus 645 may represent a bus made up of conductors that are largely common to both memory devices 640 and 641 such that only a limited number of the conductors are coupled exclusively to only one or the other of memory devices 640 and 641 to allow selective access and/or control of only one or the other of memory devices 640 and 641. Alternatively, bus 645 may represent a bus in which the majority of conductors are unique to memory devices 640 and 641, thereby permitting substantially separate, but parallel, access and/or control of memory devices 640 and 641. In such an alternative, a minimal number of control signals may be common to both memory devices 640 and 641, or there may be no common signals.

Memory devices 640 and 641 may be individual integrated circuits, perhaps mounted on the very same circuit board to which the integrated circuit incorporating memory controller 630 is mounted. As individual integrated circuits, memory devices 640 and/or 641 may be socketed or soldered directly to such a circuit board. Alternatively, memory devices 640 and 641 may themselves be individual circuit boards that each carry one or more integrated circuits, such as commonly known and widely used SIPP (single inline pin package), SIMM (single inline memory module), or DIMM (dual inline memory module) devices. Other physical designs and configurations may be employed for memory devices 640 and 641, as those skilled in the art will understand.

In many variations of this embodiment, it is likely that memory devices 640 and 641 would be of identical design, performing the same functions and being designed to meet the same timing characteristics in order to ensure consistency of response by each memory device to actions taken by memory controller 630. This is a reflection of the common practice of designing memory controllers, such as memory controller 630 in these embodiments, with the presumption that memory devices to be coupled with a memory controller will be designed to conform to timing and other characteristics set forth by widely accepted memory interface specifications (such as SDR or DDR SDRAM specifications) that are used to facilitate industry wide interchangeability of memory components. In such embodiments, it would be especially important to ensure that memory devices 640 and 641 transmit signals with timings, including starting and ending times for timing windows, that conform to a specification for which memory controller 630 has also been designed or programmed. It may be that in other variations of this embodiment, memory devices 640 and 641 may be of differing designs, perhaps having different numbers of storage locations, but memory devices 640 and 641 would still be expected to be designed to meet the same timing characteristics, again, to ensure consistency of response.

Memory controller 630 dynamically uses one or more of multiple available timings in accessing and/or using one or both of memory devices 640 and 641. Specifically, in one variation of this embodiment, after transmitting a control signal to one or both of memory devices 640 and 641, memory controller 630 dynamically uses one or the other of multiple timings to control the time at which signals (including, but not limited to data signals) transmitted by one or both of memory devices 640 and 641 in response to the control signal are latched. Different timings for the latching of signals are dynamically selected by memory controller 630 to compensate for differences in the lengths of the conductors coupling memory devices 640 and 641 to memory controller 630 that cause the time for signals propagating the length of those conductors (i.e., what is sometimes referred to as the "flight time" for signals) to differ. Alternatively, different timings may be dynamically selected by memory controller 630 to compensate for differences in timing characteristics between memory devices 640 and 641, themselves.

In various ones of the above embodiments, the use of programmable timing devices or timing devices either incorporating or having access to programmable timing settings has been described. The timing settings chosen for use by such timing devices may be selected to compensating for differences in lengths of conductors, as specifically discussed, above, or may be selected to compensate for other factors such as differences in various characteristics of the memory devices, themselves.

Where differences in lengths of conductors are a factor in setting timing settings, it may be that the manufacturer of a memory controller may employ any of a number of widely known mechanisms to provide default timing settings that would remain in effect unless and until a reprogramming of such timing settings subsequently takes place. Where such a manufacturer of a memory controller provides such default timing settings, those default timing settings may be based on a presumption that manufacturers of devices incorporating the memory controller would follow guidelines regarding lengths of conductors set forth by the manufacturer of the memory controller. Alternatively, the manufacturer of a device incorporating the memory controller may choose timing settings based on the design of the device into which the memory controller has been incorporated, regardless of whatever default settings may or may not have been provided by the manufacturer of the memory controller. In typical computer systems, timing settings may be stored in a non-volatile memory device from which they would be retrieved at a time when such computer systems are initialized, reset and/or powered up. Alternatively, timing settings may be selected from among a fixed selection of timing settings through various mechanisms including the use of pull-up/pull-down resistors and/or other components to tie pins of a package of an integrated circuit high or low.

Where differences in the characteristics of memory devices are a factor in setting timing settings, it may be that memory devices are designed to provide information leading to the choice of timing settings, themselves. This may be done through the use of a non-volatile memory storage incorporated within a memory device that can be read at a time when a memory system of which such a memory device is a part is initialized, reset and/or powered up. If a given memory device is of a form incorporating a circuit board on which one or more integrated circuits are mounted, such as a SIPP, SIMM or DIMM device, it may be that the non-volatile storage of such a memory device provides one or more settings describing the length of one or more conductors of the circuit board of that memory device.

The invention has been described in conjunction with the preferred embodiment. It is evident that numerous alternatives, modifications, variations and uses will be apparent to those skilled in the art in light of the foregoing description. It will be understood by those skilled in the art that the invention as hereinafter claimed may be practiced in support of setting timings of various components of digital electronic systems including, but not limited to computer systems. Also, although embodiments have been depicted involving timings to accommodate lengths of conductors on printed circuit boards, it will be appreciated by those skilled in the art that the invention as hereinafter claimed may be practiced in support of other timing issues, such as inherent differences in timings supported by differing components and/or devices, or such as timing issues incurred as the result of conductors routed between circuit boards through board-to-board connectors and/or cables. Furthermore, although much of the foregoing discussion has centered on the interaction of memory controllers and/or logic performing a similar function with memory devices, it will be understood by those skilled in the art that the invention as hereinafter claimed may be practiced with regard to interactions between any of a wide variety of types of electronic components that may or may not involve memory controllers or memory devices.

What is claimed is:

1. An apparatus comprising:
a first memory device;
a second memory device;
a first conductor;
a second conductor that is longer than the first conductor; and
a memory controller to which the first and second memory devices are designed be coupled, and which is coupled to the first memory device by the first conductor and to the second memory device by the second conductor, wherein a first signal transmitted by the first memory device propagates through the first conductor in less time than a second signal transmitted by the second memory device propagates through the second conductor, wherein the first and second signals are transmitted in response to a third signal transmitted by the memory controller to both the first and second memory devices, and wherein the memory controller uses a first timing setting to latch the first signal and uses a second timing setting to latch the second signal, wherein the transmission of the first, second and third signals are synchronized to a clock signal, and wherein the latching of the first and second signals by the memory controller occurs within a single cycle of the clock signal.

2. The apparatus of claim 1, wherein the first signal conveys data from the first memory device, the second signal conveys data from the second memory device, and the third signal conveys a command to both the first and second memory devices to convey data to the memory controller.

3. The apparatus of claim 1, wherein a first timing window in which the first signal may be latched by the memory controller, and a second timing window in which the second signal may be latched by the memory controller both begin within a single clock cycle, but do not overlap in time enough to allow both the first and second signals to be latched at the same time by the memory controller.

4. The apparatus of claim 1, wherein the first and second memory devices are comprised of a first and second circuit boards, respectively, to which a plurality of integrated circuits are attached, and both the first and second memory devices are coupled by way of sockets to a third circuit board to which the memory controller is attached.

5. The apparatus of claim 1, wherein the memory controller is comprised of bank interleaving logic that uses at least a portion of each of the first and second memory devices as banks of memory to implement bank interleaving.

6. The apparatus of claim 1, wherein the memory controller is comprised of an address decoder, and the selection of either the first or second memory devices is dependent on a decode of a memory address received by the address controller from another device to which the memory controller is coupled.

7. The apparatus of claim 1, wherein the memory controller is comprised of a first timing device using the first timing setting to latch the first signal, and a second timing device using the second timing setting to latch the second signal.

8. The apparatus of claim 1, wherein the memory controller is comprised of a single timing device using the first timing setting to latch the first signal and using the second timing setting to latch the second signal, and wherein the first timing setting is maintained in a first register readable by the single timing device the second timing setting is maintained in a second register readable by the single timing device.

9. An apparatus comprising:
a first memory device;
a second memory device;
a single conductor; and a memory controller to which the first and second memory devices are designed be coupled, wherein the single conductor is routed from the memory controller to the first memory device and then to the second memory device to couple the first memory device to the memory controller with a shorter conductor length than that by which the second memory device is coupled to the memory controller, wherein a first signal transmitted by the first memory device propagates to the memory controller in less time than a second signal transmitted by the second memory device propagates to the memory controller, and wherein the memory controller uses a first timing setting to latch the first signal and uses a second timing setting to latch the second signal, wherein the memory controller is comprised of a first timing device using the first timing setting to latch the first signal, and a second timing device using the second timing setting to latch the second signal.

10. The apparatus of claim 9, wherein the first signal conveys data from the first memory device to the memory controller and the first memory device transmits the first signal in response to a third signal transmitted by the memory controller to the first memory device, and wherein the second signal conveys data from the second memory device to the memory controller and the second memory device transmits the second signal in response to a fourth signal transmitted by the memory controller to the second memory device.

11. The apparatus of claim 10, wherein the third signal conveys a command to the first memory device and the fourth signal conveys a command to the second memory device.

12. The apparatus of claim 9, wherein the transmission of the first, second, third and fourth signals are synchronized to a clock signal, and wherein the number of cycles of the clock signal from the transmission of the third signal to the latching of the first signal by the memory controller is the same as the number of cycles of the clock signal from the transmission of the fourth signal to the latching of the second signal.

13. The apparatus of claim 9, wherein the first and second memory devices are comprised of a first and second circuit boards, respectively, to which a plurality of integrated circuits are attached, and both the first and second memory devices are coupled by way of sockets to a third circuit board to which the memory controller is attached.

14. The apparatus of claim 9, wherein the memory controller is comprised of bank interleaving logic that uses at least a portion of each of the first and second memory devices as banks of memory to implement bank interleaving.

15. The apparatus of claim 9, wherein the memory controller is comprised of an address decoder, and the selection of either the first or second memory devices is dependent on a decode of a memory address received by the address controller from another device to which the memory controller is coupled.

16. The apparatus of claim 9, wherein the memory controller is comprised of a single timing device using the first timing setting to latch the first signal and using the second timing setting to latch the second signal, and wherein the first timing setting is maintained in a first register readable by the single timing device the second timing setting is maintained in a second register readable by the single timing device.

17. A memory controller comprising:
   a first latch to latch a first signal transmitted by a first memory device across a first conductor;
   a second latch to latch a second signal transmitted by a second memory device across a second conductor that is longer than the first conductor independently of the first latch;
   a first timing device controlled by a programmable register to control the timing of the first latch;
   a second timing device controlled by a programmable register to control the timing of the second latch independently from the first latch;
   logic to transmit a third signal to both the first and second memory devices to cause the first memory device to transmit the first signal and to cause the second memory device to transmit the second signal; and
   bank interleaving logic to use at least a portion of each of the first and second memory devices as banks of memory to implement bank interleaving.

18. The memory controller of claim 17, wherein the first and second signals convey data.

19. The memory controller of claim 17, further comprising a clock generator to generate a clock signal that is transmitted to the first and second memory devices, wherein the transmission of the first, second and third signals are synchronized to the clock signal, and wherein the latching of the first and second signals occurs within a single cycle of the clock signal.

20. The memory controller of claim 17, further comprising an address decoder to select either the first or second memory devices depending on a decode of a memory address.

* * * * *